June 25, 1968   J. A. SEINER   3,390,135
CONTINUOUS POLYESTER PROCESS
Filed April 25, 1967

INVENTOR
JEROME A. SEINER

ATTORNEYS

3,390,135
CONTINUOUS POLYESTER PROCESS
Jerome A. Seiner, Pittsburgh, Pa., assignor to Pittsburgh Plate Glass Company, Pittsburgh, Pa., a corporation of Pennsylvania
Continuation-in-part of application Ser. No. 221,105, Sept. 4, 1962. This application Apr. 25, 1967, Ser. No. 633,590
17 Claims. (Cl. 260—75)

ABSTRACT OF THE DISCLOSURE

This application relates to a method of, and apparatus for, forming polymeric polyesters by the direct esterification of dicarboxylic acids and polyhydric alcohols wherein the polyester product is formed in a continuous operation, the reactants being mixed and heated in a closed preheating zone to a temperature above about 400° F., whereupon the reaction mixture is discharged from the preheating zone and attenuated, exposing a large surface area to a continuous gas or vapor phase, thereby liberating and removing water of esterification to complete the polyesterification reaction.

Cross-references to related applications

Figure 2:
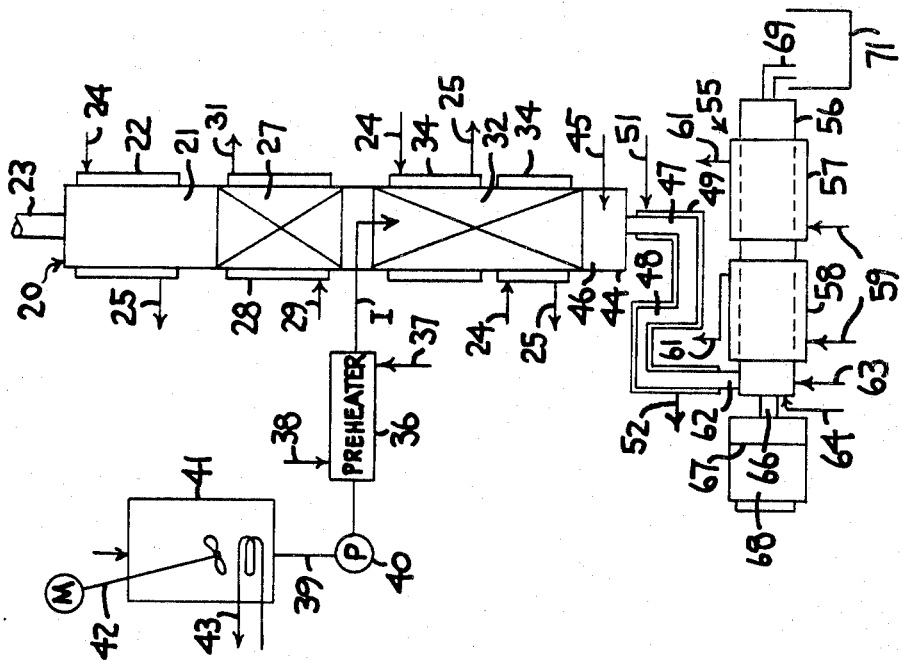

This application is a continuation-in-part of U.S. application Ser. No. 221,105, filed Sept. 4, 1962, now abandoned.

State of the prior art

In conventional practice in the production of polyesters of dicarboxylic acids and polyhydric alcohols, a batch of the reactants comprising the acid (or its anhydride) and the polyhydric alcohol is cooked for a protracted period in a large kettle, either in the presence of an azeotroping solvent, such as xylene, or without, in order to remove water of esterification. In such reaction, as polyesterification progresses, heat is supplied and the temperature of reaction is gradually increased from a minimum until the reaction is substantially completed, at which time it is at or near a maximum. In such process, the apparatus employed is, of necessity, bulky and expensive out of proportion to the output. Furthermore, excessive amounts of heat are usually required to complete the reaction.

It has appeared that theoretically, it would be much more economical to effect the polyesterification reaction between dicarboxylic acids (or anhydrides) and polyols in a continuous operation wherein the polyesterification mixture is fed as a stream into an end of a relatively long, heated reaction chamber, such as a coiled tube or a straight tube, wherein the esterification reaction is completed while the reactants are in passage, and the esterification product is withdrawn at the other end substantially as it is formed.

In actual practice, it has been found that such method as heretofore proposed has serious defects. For example, no convenient way has been available in the process as heretofore suggested for removing water of esterification as it is evolved. Notoriously, water in a polyesterification reaction is objectionable inasmuch as it tends to cause reversal of esterification and therefore, in effect, it acts as a poison for the reaction. Furthermore, it has not been practicable to form polyesters in a continuous reaction by the use of conventional techniques and apparatus because of the difficulty of supplying heat in sufficient amount to the esterification mixture. The heating of the apparatus, as by means of jackets, coils or other devices, was not practicable because of a tendency of the esterification mixture, while in contact with the heated surface at around 500° F., to gel and thus gradually build up a mass of gelled material which could not be removed except by stopping the apparatus and removing the accumulation by application of solvents or by mechanical scraping. The accumulations, if allowed to stay in the apparatus, reduced the efficiency of heat transfer and also in time, would restrict the flow of the reactants in the apparatus. Doubtless, one reason why success has not been attained in the preparation of polyesters by continuous esterification reaction, has resided in the fact that an attempt was made to bring up the temperature of the reaction mixture gradually as the reaction progressed. This was in accordance with conventional batch techniques.

Description of the invention

This invention comprises a simple and convenient method and apparatus whereby the foregoing difficulties attending the use of the continuous esterification processes and apparatus are fully, or in large measure, overcome so that by use thereof, it becomes feasible to prepare polyesters in a continuous manner.

The essence of the invention comprises:

(A) Preheating a suitable mixture of a dicarboxylic acid (or its anhydride) and a polyhydric alcohol to a relatively high temperature, but under such conditions that esterification is at most only partial. In the preheating operation or step, the desired temperature may, in some instances, be attained in two stages. For example, in the instance of anhydrides of the acids, it is feasible by heating the reaction mixture of said anhydride and the polyhydric alcohol to effect ring splitting to form a half-ester. In the instance of maleic anhydride, this ring splitting occurs at a temperature below about 200° F. The splitting is often attended by an exothermal rise. In the instance of the use of the dicarboxylic acids, there is no exothermal rise and rings are not split. The half-esters are not necessarily formed.

In any event, the reaction mixture, with or without partial esterification, is heated to a temperature above that required for complete esterification of the dicarbonyl component and the polyhydric alcohol, for example, to a temperature in a range of about 400° F. to about 575° F. During this stage, the reactants preferably are enclosed in an appropriate chamber or a closed tube, either coiled or straight, preferably under autogenetic process or, optionally, pressurized from any external pressure source, and water of esterification is not removed. Under these conditions, the polyesterification mixture can be heated to a relatively high temperature, without esterification or with but partial esterification. The esterification reaction referred to throughout the specification and claims is a direct esterification reaction, that is, the reaction of a carboxylic acid and a free hydroxyl group, liberating water of esterification or where an anhydride is employed, the initial reaction of a hydroxyl group opening the anhydride ring to form a half-ester, which may then continue to react, liberating water. The direct esterification process may be contrasted to transesterification or ester interchange, wherein ester groups are exchanged and an organic hydroxyl-bearing moiety is generated as a volatile by-product.

(B) The heated mixture of free acid and polyhydric alcohol, or of the monomeric half-ester and a half of the polyhydric alcohol, dependent upon the reactants or the conditions of preheating, is discharged substantially continuously into an appropriate flash device, such as a chamber or tube, wherein the body of hot liquid material is so attenuated or spread as to provide much free surface. Attenuation as used throughout the specification and claims is defined as spreading or separating the reaction mixture so as to increase the surface area contacting a substantially continuous gas phase which may be the ambient atmosphere in the flash device or an inert gas as hereinafter described. The attenuation of mixture to provide a great area of free surface may be effected in various manners as, for example, by dripping drops or a thin stream of preheated material, by spraying, by flowing as a film upon a wetted wall, by flowing a film over a packing in a column, or other means for increasing surface area, many of which are conventionally employed in distillation columns or other distillation devices, or by a combination of these methods.

(C) The resultant mixture in the flash device, for best operation, is further contacted with a dry gas, such as carbon dioxide or nitrogen, in a volume sufficient to carry away water of esterification as a vapor at the time it is liberated, thus causing the polyesterification reaction to proceed substantially to completion.

(D) The final stage involves collecting the polyester product for further treatment or for use, as may be desired.

Figure 1:
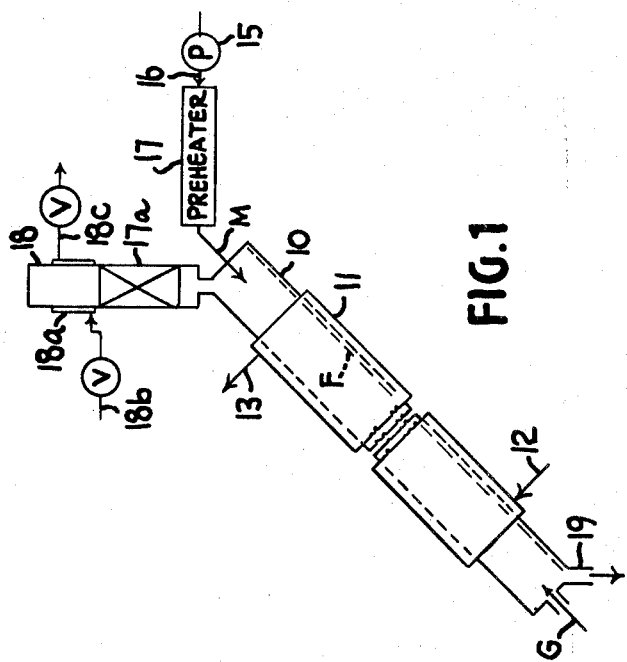

Appropriate apparatus for use in the practice of the invention is shown in the drawings, wherein FIGURES 1 and 2 diagrammatically illustrate simplified forms of apparatus suitable for use in performing the polyesterification reaction in accordance with the provisions of this invention.

The apparatus as shown in FIGURE 1 is simple and is of the wetted wall type and comprises a mere inclined elongated tube 10 which is provided intermediate of its length with an appropriate heat insulation 11, such as a layer of rock wool, cellular glass, or the like. If preferred, the insulation may also be replaced by a jacket to which a small amount of heat may be supplied, as by a heat transfer medium such as hot water, glycol, or the like, circulated through inlet 12 and outlet 13 to reduce heat losses through the walls of the tube. Such jacket is not operated at a temperature sufficient substantially to increase the temperature of the column. Liquid mixture is fed to the top of the tube in metered amount by means of pump 15 to conduit 16, and is heated to its maximum temperature, e.g., 450° F. to 550° F., in a preheater 17. It normally will be under pressure in the preheater. Liquid mixture of preheated carbonyl compound from line 16 and polyhydric alcohol is introduced slowly into the top of the tube, as indicated at M, and is allowed to trickle down the latter in a film F. Immediately upon release of the mixture into tube 10, most of the water (either free or latent) in the mixture is liberated, thus causing the reaction of esterification to proceed at once to an advanced stage. For example, upon striking the atmospheric pressure within the top of the tube 10, the acid value of the mixture, in the instance of maleic anhydride and propylene glycol as the reactants, drops from about 200 to about 70.

Simultaneously with the introduction of polyesterifiable mixture at the top of the column, an inert gas, such as carbon dioxide, is fed in, as indicated at G, at the closed bottom of the tube in countercurrent flow to the liquid mixture. The amount thereof should be sufficient substantially completely to remove water of esterification.

Polyester in substantially water-free state and of a good acid number and being suitable for the same purposes as polyester prepared by conventional batch methods, may be drawn off from the lower end of tube 10, as at 19.

For purposes of conserving polyhydric alcohol which may tend to flash off from the reaction mixture along with water vapor, the top of the tube 10 may be provided with a packed column 17a, operated at a temperature selectively to remove polyhydric alcohol from the gases and vapors from the tube 10. The top of the column 17a may also be provided with a partial condenser 18 held at a temperature slightly above the boiling point of water by jacket 18a having inlet 18b and outlet 18c for heat transfer medium, whereby to allow water vapor to pass out of the system, but to return polyhydric alcohol through the column 17a to the tube 10 in a highly heated state in which it will not unduly cool the reaction mixture.

The product obtained may be used for various purposes as, for example, in the preparation of polyester resins wherein the polyester is mixed with added monomer, such as styrene, and is then subjected to curing into a solid, resinous product. Other forms of the polyesters containing relatively large numbers of hydroxyl groups per molecule may be employed in the preparation of polyurethane resins in well-known manner.

If desired, the tube 10 may also be provided with a scraper blade (not shown) running in close contact to the wall thereof. Such blade may be carried by a shaft extending longitudinally of the tube and being driven by means of a motor and speed reducing mechanism. The blade distributes the polyesterifiable mixture over the walls of the tube and promotes efficiency of evaporation for water removal.

In FIGURE 2 is diagrammatically illustrated a somewhat more sophisticated embodiment of apparatus. In accordance with this figure, the apparatus comprises a vertical tube 20 of stainless steel, aluminum or other appropriate relatively-resistant material, provided with an inlet I intermediate of its length for introduction of preheated mixture. More will subsequently be said of the system for supplying mixture to the column.

The tube 20 may comprise an upper section or portion 21 above inlet I which is provided with a jacket 22 for the circulation of a suitable heat transfer medium. This section is designed to act as a partial condenser wherein polyhydric alcohol component from the reaction zone of the tube is condensed and returned while gases and volatile products comprising water are discharged in gas or vapor phase from the top of the tube, for example, through a vent tube 23. The heat transfer material for the jacket 22 may be supplied through an inlet 24 and an outlet 25 leading to an appropriate source of medium which is heated to temperature, e.g., in a range of about 150° F. to about 260° F. This medium is used to maintain a vapor temperature of about 205° F. to 250° F. in the vent tube 23.

Below the section 21 and above inlet I is a packed column section 27 which may also be jacketed, as indicated at 28, and being provided with inlet 29 and outlet 31 for heat transfer medium. The packed column section 27, it will be understood, condenses polyhydric alcohol vapors circulating in tube 20 and strips the condensate of water which may be dissolved therein.

Below the packed section 27 of tube 20 is disposed a second packed section 32 which provides a reaction zone for the preheated mixture and wherein the reaction mixture is discharged, as by means of an inlet 33, and is allowed to trickle down slowly toward the bottom of the tube 20 and in the process of so doing, undergoes polyesterification, the esterified product being stripped of water formed by the reaction substantially as fast as it is formed, thus preventing the reversal of the reaction.

As indicated, the section 32 may be provided with sections 34 which may comprise thermal insulation, such as fiber glass, cellular glass or other appropriate material, designed to prevent loss of heat from the esterification mixture as it trickles downwardly through the packing of the tube. If preferred, the insulation may be replaced by jackets for the circulation of a heat transfer medium. It will be recognized that it is seldom necessary to supply heat more than make-up heat to prevent excessive radiation from the tube. The heat initially introduced in the preheated mixture is in most instances sufficient to maintain the reaction until polyesterification is completed.

Polyesterification mixture in preheated state is supplied to the inlet I as from a preheater 36 of conventional design, supplied with a heat transfer medium by means of inlet 37 and outlet 38. The mixture, in passing through the heat exchanger, normally is brought to a temperature within a range of about 400° F. to about 575° F., and preferably to a temperature in a range of 450° to 550° F., dependent upon the temperature required for rapid and efficient reaction to form the polyester. It will be recognized that the preheater constitutes a closed system wherein any water liberated by ester interchange reaction is retained so that very little esterification reaction takes place therein because of the reversal of the reaction by means of evolution of water which would attend any appreciable esterification reaction.

Polyesterification mixture, in fused state or in the form of a slurry, is supplied to preheater 36 by means of a conduit 39 having metering pump 40. A suitable source of supply of polyesterifiable mixture is indicated at 41, having an agitator 42 and a heating coil 43, through which heat exchange medium may be circulated in order to effect melting and blending of the polyesterification mixture comprising dicarboxylic acid (or anhydride) and polyhydric alcohol. It will be recognized that a portion of, or all of, the individual raw components of the polyester may be separately heated to the desired ultimate temperature. The heated components may then be mixed in a closed chamber before they are introduced into the reaction zone. They may also be introduced into the reaction zone through separate inlets and then mixed within said reaction zone.

In event that the carbonyl component of the esterification mixture is the anhydride of a dicarboxylic acid, such as maleic anhydride, it will be recognized that partial esterification can be effected in the container 41 to split the anhydride rings and to form a half-ester of the dicarboxylic acid. This reaction does not involve the evolution of water and takes place at a relatively low temperature, for example, at about 200° F. In event that the dicarboxylic acid component is maleic anhydride, the splitting of the anhydride ring is also attended by the evolution of substantial amounts of heat, and once splitting is initiated, will take place spontaneously. In many instances, it is only necessary to heat the mixture sufficiently to initiate the anhydride ring splitting phase of the reaction. Subsequently, it is often desirable to employ the coil 43 as a means for circulating a cooling medium in order to remove heat from the mixture.

It is desirable, though not essential, for purposes of facilitating the removal of water flashed from or otherwise evolved in the reaction mixture as it passes through the packed section 32 of the tube 20, to blow inert gas, such as carbon dioxide or nitrogen, through the tube 20. Such gas may be supplied to the bottom portion 44 of the tube by means of a suitable inlet 45. The rate of gas flow should be so proportioned with respect to the feed of reactants through the inlet I that substantially all of the water liberated in the column is carried away through the packed column section 27 and the partial condenser section 21, and ultimately the gas, stripped of any entrained polyhydric alcohol but still containing the water vapors, is discharged through the vent 23. Supports 46, also in the section 44, may be provided for purposes of holding the packing in the section 32.

Polyester product of appropriate acid value is allowed to drain by gravity from section 44 through an outlet conduit 47 having a U-shaped trap portion 48 designed to contain a liquid seal formed of polyester product, thus assuring that the gases introduced through the inlet 45 are forced to pass upwardly through the tube 20 rather than discharging backwardly through the outlet 47. The outlet 47 and trap section 48, if preferred, may be provided with a jacket 49 through which heat transfer medium is circulated, by means of inlet 51 and outlet 52, in order to assure that the polyester mixture does not solidify or become too viscous while being discharged from the column.

It is manifest that the polyesterification mixture may be subjected to any subsequent treatments to which polyesters prepared by conventional techniques may be subjected. For example, when the polyester contains as a carbonyl component, an alpha, beta-ethylenic dicarboxylic acid, such as maleic acid or fumaric acid, it is often desirable to blend the polyester with an added monomer and also with an inhibitor of gelation, as well as other modifiers. To this end, an appropriate blender may be provided, as indicated at 55. This blender is shown as comprising a horizontal tube 56, which may be surrounded by insulation or jacket sections 57 and 58 having inlets 59 and outlets 61 for heat transfer medium. The polyester product to be treated is introduced into the blender as through a downwardly-directed portion 62 of the discharge tube 47, and concurrently, the product thereby added, such as monomer, is introduced as at 63. It is also frequently desirable, especially in the instance of relatively reactive mixtures, such as monomers and polyesters containing as components alpha, beta-ethylenic dicarboxylic acids such as maleic acid, to introduce an inhibitor of gelation into the blender. This may be effected, for example, by means of a third inlet 64. Appropriate inhibitors comprise polyhydric phenols, such as hydroquinone, and salts of quaternary ammonium compounds, such as trimethyl benzyl ammonium chloride. These are used in small amounts, e.g., 0.001 percent to 1 percent based upon the polyester.

For purposes of impelling the polyester-monomer mixture through the blender and also for purposes of thoroughly agitating the mixture and thus effecting complete blending thereof, the blender is provided with an agitator, the shaft portion 66 of which is indicated as projecting from the rear end of the blender. This shaft is provided within the blender with appropriate blades (not shown) and is driven by a suitable speed reducer 67 having a motor drive 68.

Product from the blender, such as a mixture of polyester and monomer, may be discharged from the blender through outlet 69 into a suitable receiver 71.

The polyester may be used for the same purposes as polyesters prepared from the same ingredients, but by batch-cooking.

The reaction materials

In the preparation of polyesters by continuous reaction of a dicarboxylic acid (or anhydride) and a polyhydric alcohol in accordance with the provisions of this invention, the esterification ingredients heretofore suggested for the preparation of such polyesters may be employed. The carbonyl components (dicarboxylic acid or anhydride), for example, may comprise such acids as:

Maleic acid
Maleic anhydride
Itaconic acid
Fumaric acid
Chlorendic acid
Chlorendic anhydride
Cis-endomethylenetetrahydrophthalic acid
Cis-endomethylenetetrahydrophthalic anhydride
Succinic acid
Succinic anhydride
Sebacic acid
Phthalic acid
Phthalic anhydride
Isophthalic acid
Terephthalic acid
Adipic acid and many others. In some instances, monocarboxylic acids or their anhydrides may also be included. Appropriate monocarboxylic acids comprise:

Acetic acid
Acetic anhydride
Stearic acid
Oleic acid
Linoleic acid
Linolenic acid
Benzoic acid
and others.

The polyhydric alcohol component may be dihydric, as represented by:

Propylene glycol
Ethylene glycol

Diethylene glycol
Triethylene glycol
Neopentyl glycol
Tetraethylene glycol
Butylene glycol
Dipropylene glycol and others. Alcohols containing three or more hydroxyls are represented by:

Glycerol
Trimethylolethane
Trimethylolpropane
Pentaerythritol
Sorbitol
and many others.

In most instances, the alcohol component will be employed in an amount at least substantially molecularly equivalent to the acid components, although the acid component may be in excess. Thus, for example, the ratio of acid component to polyol may be in a range of from about 20 molecular percent excess acid component to about 95 molecular percent excess polyol. Usually, the amount of polyhydric alcohol will be in excess of equivalency with respect to the acid material although acid excesses may be employed to obtain an acid-terminated polyester having an acid value of 1 to 150, or even 300 or higher. The excess may, for example, be within a range of about 1 to about 95 molecular percent, and preferably about 1 to about 40 molecular percent. The higher excesses of polyol provide polyesters of higher hydroxyl value and some are desirable in those instances wherein the polyester is designed for reaction with organic diisocyanates in the prepaartion of polyurethane resin or foams thereof.

Some of the polyhydric alcohol may be replaced by an anhydride of the corresponding alcohol. For example, when the polyester of ethylene glycol or propylene glycol and maleic acid or phthalic acid is to be formed, a part, e.g., 1 percent to 90 percent, of the glycol may be replaced by the corresponding oxide.

The esterification mixture may also include small catalytic amounts, e.g., 0.001 percent to 1 percent by weight based upon the mixture, of direct esterification catalysts, such as para-toluene sulfonic acid, zinc salts such as zinc chloride, tin oxide, tin tetrachloride, tin octoate, and others. The use of such catalysts, however, is not considered to be essential in the practice of the invention.

The application of the techniques of the invention in the preparation of a polyester is represented by the following examples.

EXAMPLE I

In this example, polyesterification was effected by continuously passing preheated polyol mixture and a mixture of maleic anhydride and phthalic anhydride through an inclined, straight glass tube, as represented in FIGURE 1 of the drawings. The tube was 14 inches long and of an internal diameter of 1½ inches. It was provided with a 1-inch layer of insulation along its length.

The reaction mixture comprises:

| | Moles |
|---|---|
| Maleic anhydride | 1 |
| Phthalic anhydride | 1 |
| Propylene glycol | 2.2 |

This mixture was heated to effect an exothermal reaction, at the end of which the acid value was found to be approximately 200. The product was considered to be the half-ester of the dicarboxylic acids and the propylene glycol. This half-ester was heated (in a closed chamber in order to prevent the further esterification reaction) to approximately 500° F. The mixture was then introduced at the top of the tube, which then acted as a wetted wall reactor. When the preheated mixture was poured into the top of the tube, there was a flash reaction with evolution of water, and the acid value dropped approximately to 70. The temperature also dropped rapidly so that most of the reaction occurred in the top of the tube. Inert gas (carbon dioxide) was blown in at the lower extremity of the tube 10 in order to carry away water of reaction liberated in the polyesterification.

This reaction was repeated a number of times using different feed rates of polyesterifiable mixture. The reaction conditions, e.g., the reaction temperature and the feed rate, as well as the acid value of the resultant polyester products, are tabulated as follows:

| Feed Rate Gallons per Hour | Feed Temperature (° F.) | Acid Value |
|---|---|---|
| 0.25 | 515 | 69.0 |
| 0.50 | 507 | 64.9 |
| 1.33 | 505 | 66.5 |

The resultant products were useful polyesters of the unsaturated type, which could be mixed with styrene and casein in order to form rigid resin bodies.

EXAMPLE II

In this example, a packed column was employed in place of the wetted wall tube of Example I. The column was of stainless steel pipe, 1 inch in diameter and 40 inches in length. The packed portion of this was 12 inches long. The working volume of the column was 9.4 cubic inches. The packing comprises ½-inch Intalox saddles. Obviously, any other appropriate packing could be employed. The column was covered with one inch of insulative material in order to prevent excessive loss of heat. The esterifiable mixture corresponded to that of Example I and was fed in at a temperature of about 500° F. The temperature after introduction into the column dropped at the initial flash to about 477° F., and the temperature dropped gradually with the passage of the esterified material down the column. However, the temperature at the conclusion was still 320° F. The mixture, as it passed through the packing in the column, was exposed to a flow of inert gas (carbon dioxide).

Two runs were conducted, the feed rates, the temperatures of reaction and the acid values of the ultimate products being as follows:

| Feed Rate Gallons per Hour | Feed Temperature (° F.) | Acid Value |
|---|---|---|
| 0.83 | 500 | 50.0 |
| 1.25 | 505 | 49.0 |

The acid value of the resultant product is within the range of a commercial product of like composition employed in the production of resins. The polyester product of this example could be mixed with styrene or other monomers and employed in the production of useful castings.

The foregoing apparatus and techniques could be employed in the production of polyesters wherein various other dicarboxylic acids (or their anhydrides) than maleic anhydride and phthalic anhydride are used. Also, propylene glycol could be replaced by various other polyhydric alcohols such as are herein disclosed.

Although specific examples of the invention have been set forth hereinabove, it is not intended to limit the invention thereto, but to include all of the variations and modifications falling within the scope of the appended claims.

I claim:

1. The method of continuously forming a polymeric polyester of a polycarboxylic acid and a polyol by reacting, by direct condensation polyesterification, a mixture comprising a polyhydric alcohol and a material selected from the group consisting of a dicarboxylic acid and anhydrides thereof, the ratio of the acid component to the polyol being in a range of about 20 molecular percent excess acid component to about 95 molecular percent excess polyol, which comprises substantially continuously preheating in a closed system said mixture, containing, in addition, water of esterification formed in the closed system, to a temperature in the range of about 400° F. to about 575° F. and then discharging the resulting liquid product from the closed preheating system and substantially continuously attenuating the body of said liquid product in order to remove water of esterification therefrom, in addition to water of reaction formed in the closed system, and to complete the polyesterification reaction.

2. A method as in claim 1 wherein the attenuation of the body of the said liquid product is accomplished without the addition of further heat.

3. A method as in claim 2 wherein the attenuation of the body of the said liquid product is accomplished by flowing the said liquid product as a film over an extended surface while blowing the surface of the film with a non-reactive gas in order to remove water of esterification.

4. A method as in claim 1 where the surface created by attenuating the body of said liquid product is contacted with a flowing, non-reactive gas in order to remove water of esterification therefrom.

5. A method as in claim 4 wherein the non-reactive gas is passed in a countercurrent manner in contact with the attenuated surface and the gas-containing water vapors are removed from the system.

6. A method as in claim 1 wherein the polyol is present in an excess of about 1 to about 40 molecular percent.

7. A method as in claim 6 wherein the surface created by attenuating the body of said liquid product is contacted with a flowing non-reactive gas in order to remove water of esterification therefrom.

8. A method as in claim 1 wherein a dicarboxylic acid is employed.

9. A method as in claim 8 wherein the surface created by attenuating the body of said liquid product is contacted with a flowing non-reactive gas in order to remove water of esterification therefrom.

10. A method as in claim 1 wherein an anhydride is employed and the polyhydric alcohol and the anhydride are reacted to a preliminary stage at which exothermal reaction is completed prior to the preheating step.

11. A method as in claim 10 wherein the surface created by attenuating the body of said liquid product is contacted with a flowing non-reactive gas in order to remove water of esterification therefrom.

12. A method as in claim 11 wherein the non-reactive gas is passed in a countercurrent manner in contact with the attenuated surface and the gas-containing water vapors are removed from the system.

13. A method as in claim 12 wherein the polyol is present in an excess of about 1 to about 40 molecular percent.

14. A method as in claim 10 wherein the product of said preliminary reaction stage, prior to preheating, has an acid value above 200.

15. A method as in claim 11 wherein the anhydride comprises maleic anhydride and contact with the non-reactive gas is continued until an acid value below 80 is obtained.

16. A method as in claim 11 wherein the anhydride comprises a mixture of maleic anhydride and phthalic anhydride which is prereacted in said preliminary stage to form a half ester, and where the preheating step is effected without substantially removing water of reaction, and then the surface of the resultant preheated product is attenuated, whereby water or esterification is flashed off.

17. A method as in claim 16 wherein the product of said preheating step is continuously discharged as a stream into one end of an elongated reaction chamber, while continuously flowing non-reactive gas countercurrently to the flow of the said product of said preheating step, whereby water of esterification is removed to form said polyester.

References Cited

UNITED STATES PATENTS

| | | | |
|---|---|---|---|
| 2,634,234 | 4/1963 | Kuhrt | 203—89 |
| 3,127,377 | 3/1964 | Lindenauer | 260—75 |
| 3,185,668 | 5/1965 | Meyer et al. | 260—75 |
| 3,185,669 | 5/1965 | McKinney | 260—75 |
| 3,192,184 | 6/1965 | Brill et al. | 260—75 |

WILLIAM H. SHORT, *Primary Examiner.*

LOUISE P. QUAST, *Examiner.*